(12) United States Patent
Moloy et al.

(10) Patent No.: US 8,048,977 B2
(45) Date of Patent: Nov. 1, 2011

(54) ORGANOSILICON POLYMERS

(75) Inventors: Kenneth Gene Moloy, Hockessin, DE (US); Lech Wilczek, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 535 days.

(21) Appl. No.: 12/280,402

(22) PCT Filed: Apr. 28, 2006

(86) PCT No.: PCT/US2006/016341
§ 371 (c)(1),
(2), (4) Date: Aug. 22, 2008

(87) PCT Pub. No.: WO2007/130014
PCT Pub. Date: Nov. 15, 2007

(65) Prior Publication Data
US 2009/0069525 A1    Mar. 12, 2009

(51) Int. Cl.
*C08G 77/08* (2006.01)

(52) U.S. Cl. .............. 528/15; 528/31; 528/32; 427/387; 428/447

(58) Field of Classification Search ............ 528/15, 528/31, 32; 427/387; 428/447
See application file for complete search history.

(56) References Cited

U.S. PATENT DOCUMENTS

| | | | |
|---|---|---|---|
| 3,438,936 A | | 4/1969 | Lamoreaux |
| 5,340,777 A | * | 8/1994 | Leung et al. ............. 501/12 |
| 5,373,007 A | * | 12/1994 | Bruneau et al. ........... 514/224.2 |
| 5,545,837 A | * | 8/1996 | Kobayashi ............. 556/460 |
| 7,799,887 B2 | * | 9/2010 | Omi et al. .............. 528/31 |
| 2006/0074212 A1 | * | 4/2006 | Chapman et al. ........... 528/15 |

FOREIGN PATENT DOCUMENTS

JP   2005298606   10/2005

OTHER PUBLICATIONS

M. J. Michalczyk et al., High-Temperature Stabilization of Cross-Linked Siloxanes Glasses, Chemistry of Materials, 1993, vol. 5:1687-1689.

S. U. A. Redondo et al., Polycylic Silicone Membranes. Synthesis, Characterization and Permeability Evaluation, Polymer, 2001, vol. 42:1319-1327.

International Search Report, PCT International Application PCT/US2006/16341, Mailed Aug. 20, 2008.

* cited by examiner

*Primary Examiner* — Margaret Moore

(57) ABSTRACT

The present invention is directed to compositions and processes that are useful in making organosilicon polymers, including cross-linked organosilicon networks. The invention is also directed to articles that incorporate the cross-linked organosilicon networks.

7 Claims, No Drawings

ORGANOSILICON POLYMERS

FIELD OF THE INVENTION

The present invention is directed to compositions and processes that are useful in making organosilicon polymers, including cross-linked organosilicon networks. The invention is also directed to articles that incorporate the cross-linked organosilicon networks.

BACKGROUND

Dielectric materials with low dielectric constant (k) are used in making the interconnect structure of integrated circuits (IC), and new materials with improved properties are the focus of much current research. In addition to having a low dielectric constant, to be useful in electronic devices, the materials must also be thermally and chemically stable; mechanically robust; free of corrosives or mobile charges; and compatible with current IC manufacturing processes. It is especially desirable to be able to form a layer of dielectric material via spin-coating. Additional requirements may include strong adhesion to other component or layers of an IC and low shrinkage.

One promising class of materials is highly crosslinked organosiloxanes. These materials are prepared by the platinum-catalyzed crosslinking of polyhydrosiloxanes with polyvinylsiloxanes. The material derived from D4Vi (tetramethyltetravinylcyclotetrasiloxane) and D4H (tetramethylcyclotetrasiloxane) is a "hard, glassy material", with excellent thermal stability up to 450° C. Both siloxanes are low viscosity liquids and thus solvents are not required to form liquid mixtures. Also, the hydrosilation reaction proceeds smoothly and with high conversion at very low platinum concentration. (See M. J. Michalczyk et al., Chemistry of Materials, Vol. 5 (12), 1993, pp 1687-1689; and S. U. A. Redondo et al., Polymer 42 (2001) 1319-1327.)

JP 2005298606 discloses a process for preparing heat-resistant curable cyclosiloxane compositions by heating a mixture of two different siloxane polymers and a hydrosilation catalyst. In one example, a composition comprising a 6:1 reaction product of 1,3,5,7-tetramethylcyclotetrasiloxane (I) and 1,3,5,7-tetravinyl-1,3,5,7-tetramethylcyclotetrasiloxane (II), a 1:6 reaction product of (I) and (II), and a Pt-vinyltetramethyldisiloxane complex was applied on an Al board and heated at 150° C. for 2 hr to give a coating that reportedly has good adhesion and no surface cracks.

There is a continuing need for dielectric materials that have suitably low k properties, are thermally and mechanically robust, and can be prepared by processes that are compatible with current IC fabrication steps.

SUMMARY OF THE INVENTION

One aspect of this invention is a process for preparing a organosilicon polymer of balanced stoichiometry that can be used in applications such as spin-coating. This process comprises:

a. forming a pre-polymer by reacting an unbalanced stoichiometric mixture of a first monomer comprising two or more Si—H groups and a second monomer comprising two or more Si-(alkenyl) groups in the presence of a hydrosilation catalyst; and
b. reacting the pre-polymer with additional monomer to form a polymer of balanced stoichiometry.

Another aspect of this invention is a process comprising:

a. forming a pre-polymer by reacting an unbalanced stoichiometric mixture of a first monomer comprising two or more Si—H groups and a second monomer comprising two or more Si-(alkenyl) groups in the presence of a hydrosilation catalyst;
b. reacting the pre-polymer with additional monomer to form a polymer of balanced stoichiometry; and
c. heating the polymer of balanced stoichiometry to form an organosilicon polymer.

Another aspect of this invention is an article comprising a cross-linked polymer formed by heating the polymer of balanced stoichiometry.

DETAILED DESCRIPTION OF THE PREFERRED EMBODIMENTS

The organosilicon polymers of this invention are based on inherently low k elements: Si, O, C and H. Organosilicon polymers (which include polysiloxanes and silicones) are known to be thermally stable and chemically inert. Cross-linked organosilicon networks also possess remarkable mechanical toughness and durability. As such, they are ideal materials to be used in low k and other electronic applications. What has been lacking until now is a process for incorporating such materials into electronic devices, such as integrated circuits, using processes that are compatible with current manufacturing processes. In particular, it has not been possible until now to form thin layers of the organosilicon networks, for example by spin-coating.

In a typical organic polymer spin-coating process, a solution of polymer in a solvent is applied to the substrate. The solution viscosity is adjusted by changing the polymer concentration. A significant amount of the solvent is evaporated during the spinning, resulting in a further viscosity increase while the material is being applied to the wafer or substrate. The resulting films are then baked to remove any remaining solvent, thus leaving a polymer film on the substrate.

However, a mixture of hydrosiloxane or hydrosilane monomers and vinylsiloxane or vinylsilane monomers used to form an organosilicon network is typically low viscosity, even without added solvent. Since essentially no polymerization occurs during the spinning process (30-60 sec at room temperature), the viscosity remains very low until the sample is warmed to cure and form the network. Because the low viscosity material is substantially more prone to beading than the high viscosity polymer solutions used in typical spin-coating processes, poor quality films are produced.

Better quality films can be made by increasing the viscosity of the siloxane and/or silane mixture prior to spin-coating by partially reacting the siloxanes and/or silanes and then quickly applying the solution to the substrate, followed by spinning and thermal curing. But determining the proper point to apply the intermediate viscous fluid to the substrate for spinning can be difficult. If done too soon, before enough viscosity had built, the sample remains prone to beading after spinning and before final curing. If done too late, comets, streaks and other imperfections are produced due to the formation of gels.

One embodiment of this invention is a process for preparing a organosilicon polymer of balanced stoichiometry that can be used in applications such as spin-coating. This process comprises:

a. forming a pre-polymer by reacting an unbalanced stoichiometric mixture of a first monomer comprising two or more Si—H groups and a second monomer comprising two or more Si-(alkenyl) groups in the presence of a hydrosilation catalyst; and b. reacting the pre-polymer with additional monomer to form a polymer of balanced stoichiometry.

Suitable first monomers include 2,4,6,8-tetramethylcyclotetrasiloxane, 1,1,3,3,5,5-hexamethyltrisiloxane, 1,1,3,3,5,5,7,7-octamethyltetrasiloxane, pentamethylcyclopentasiloxane, trimethylcyclotrisiloxane, tetrakis(dimethylsiloxy)silane, phenyltris(dimethylsiloxy)silane, methyltris(dimethylsiloxy)silane, tetraethylcyclotetrasiloxane, 1,1,3,3-tetramethyldimethylsiloxane, 1,1,3,3-tetraisopropyldisiloxane, 1,4-bis(dimethylsilyl)benzene, 1,1,4,4-tetramethyldisilethylene, 1,3-diphenyl-1,3-dimethyldisiloxane, bis(p-dimethylsilyl)phenyl ether, 4,4'-bis(dimethylsilyl)biphenyl, 2,6-bis(dimethylsilyl)naphthalene.

Suitable second monomers include vinyl compounds such as 1,3,5-trivinyl-1,3,5-trimethylcyclotrisiloxane, 2,4,6,8-tetramethyl-2,4,6,8-tetravinylcyclotetrasiloxane, 1,3,5-trivinyl-1,1,3,5,5-pentamethyltrisiloxane, tris(vinyldimethylsiloxy)methylsilane, 1,5-divinylhexamethyltrisiloxane, tris(vinyldimethylsiloxy)phenylsilane, tetrakis(vinyldimethylsiloxy)silane, pentavinylpentamethylcyclopentasiloxane, 1,5-divinyl-3-phenylpentamethyltrisiloxane, 1,4-bis(dimethylvinylsilyl)benzene, 4,4'-bis(dimethylvinylsilyl)biphenyl, tetravinylsilane, and 2,6-bis(dimethylvinylsilyl)naphthalene. Other suitable unsaturated silanes and siloxanes include those with allyl groups, such as diallyldimethylsilane, diallyldiphenylsilane, tetraallylsilane, phenyltriallylsilane, 1,5-diallyl-3,3-diphenyl-1,1,5,5-tetramethyltrisiloxane, 1,3-diallyltetrakis(trimethylsiloxy)disiloxane, 1,3-diallyltetramethyldisiloxane, and methyltriallylsilane. Other silanes or siloxanes can also be used that contain at least two alkenyl groups bonded to Si.

It is not necessary that the first and second monomers have the same number of functional groups, as long as each monomer has at least two functional groups. To form cross-linked organosilicon polymers, at least one of the monomers must contain at least 3 functional groups.

Suitable hydrosilation catalysts are typically transition metal complexes containing cobalt, rhodium, palladium, ruthenium, nickel, or platinum. Suitable Pt hydrosilation catalysts include platinum-divinyltetramethyldisiloxane (Karstedt's catalyst), platinum carbonyl cyclovinylmethylsiloxane, platinum cyclovinylmethylsiloxane (Ashby-Karstedt catalyst), platinum-octanal/octanol complex, and hexachloroplatinic acid. Other hydrosilation catalysts include free-radical based systems such as AIBN.

The ratio of first monomer to second monomer is such that there is significantly more of one functional group (e.g., Si—H) than the other (e.g., Si—CH=CH$_2$). The optimal range of stoichiometries depends on both the number of functional groups per monomer and the reactivity of the functional groups. Typically, the ratio of functional groups is about 2.5:1 to about 7:1; ratios in this range can be referred to as "unbalanced stoichiometry". A "balanced stoichiometry", as used herein, means a ratio of Si—H to Sialkenyl group in the range 1.5:1 to 1:1, preferably about 1:1. For D4Vi and 1,4-BDSB, it has been found that molar ratios of 1:5 to 1:7 (D4Vi to 1,4-BDSB) can be advantageously used. This is equivalent to a molar ratio of functional groups of 1:2.5 to 1:3.5.

The reaction of the monomers in the presence of the hydrosilation catalyst is typically carried out by mixing the two monomers and heating until one of the monomers is substantially consumed. If the monomers are both liquids, or if one monomer is soluble in the other, no solvent is required. Typically, the reaction is heated from about 20° C. to about 150° C., or more typically from about 50° C. to about 120° C.

The progress of the reaction can be monitored by infrared spectroscopy, since the Si—H and vinyl groups each have characteristic IR absorptions.

Viscosity can also be used to monitor the reaction, as it represents an indirect, but practical, parameter for gauging the extent of conversion, building molecular weight or crosslinking. Pre-polymers with viscosities from about 0.1 to 100 Poise preferably from 0.2 to 50 Poise and more preferably from 0.3 to 20 Poise at room temperature typically provide well-defined films with well-controlled thickness.

It is not necessary that all of the stoichiometrically deficient monomer be consumed. However, high conversion ensures that the viscosity at room temperature will be stable. "High conversion", as used herein, means at least 80% conversion, preferably at least 90% conversion, more preferably at least 95% conversion.

Another embodiment of this invention further comprises heating the polymer of balanced stoichiometry from about 50° C. to about 200° C. to form a cross-linked organosilicon polymer.

Another embodiment of this invention comprises coating the polymer of balanced stoichiometry onto a substrate and then heating the polymer of balanced stoichiometry from about 50° C. to about 200° C. to form a coating of a cross-linked organosilicon polymer on the substrate. The coating can be carried by any conventional method. Spin-coating produces uniform coatings. Coating thickness can be controlled by a combination of spinning speed and time, and by the viscosity of the mixture of silane pre-polymer and additional monomer.

Another embodiment of this invention is an article comprising a substrate coated with a organosilicon pre-polymer, wherein the pre-polymer is prepared by a.) reacting an unbalanced stoichiometric mixture of a first monomer comprising two or more Si—H groups and a second monomer comprising two or more Si—(CH=CH$_2$) groups in the presence of a hydrosilation catalyst; and b.) reacting the pre-polymer with additional monomer to form a polymer of balanced stoichiometry.

Another embodiment of this invention is an article comprising a substrate coated with a cross-linked organosilicon polymer of this invention.

By using a nonstoichoimetric combination of monomers, the initial reaction of the monomers stops when the limiting reagent is consumed. By choosing a significantly unbalanced stoichiometry, e.g., a molar ratio of 1:7 to 1:5, the initial product of the hydrosilation reaction is oligomeric, with sufficiently high viscosity for spin-coating, even after dilution with additional monomer. Viscosity can be controlled by the amount of limiting reagent employed to prepare this oligomer. Immediately prior to spin-coating, additional monomer is added to give the proper stoichiometric combination of monomers.

A further advantage of this procedure is that the nonstoichiometric 'prepolymer' is indefinitely shelf-stable. This allows the preparation of relatively large batches of material that can then be used as needed for spin coating.

EXAMPLES

Unless otherwise specified, all temperatures are in degrees Celsius, all mass measurements are in grams, and all percentages are weight percentages.
Acronyms

| | |
|---|---|
| D4Vi | Tetramethyltetravinylcyclotetrasiloxane = cyclo-[Si(CH=CH$_2$)(CH$_3$)O]$_4$ |
| 1,4-BDSB | 1,4-bis(dimethylsilyl)benzene |
| D4H | Tetramethylcyclotetrasiloxane = cyclo-[Si(H)(CH$_3$)O]$_4$; |
| 4,4'-BDSBP | 4,4'-bis(dimethylsilyl)biphenyl |

The platinum catalyst typically used to prepare the compositions described in these examples is a commercially available platinum-divinyltetramethyldisiloxane complex, 2.1-2.4 wt % platinum in xylene solvent (Gelest Inc.; Morrisville, Pa., USA). Other hydrosilation catalysts are known and can be used to prepare the compositions described herein. The hydrosiloxane, hydrosilane and vinylsiloxane monomers described in the examples below were obtained from commercial sources (Gelest, Inc.; Sigma-Aldrich, Milwaukee, Wis., USA).

Eight inch, p-doped, low resistivity silicon wafers were obtained from Wafernet, Inc. (San Jose, Calif., USA). The wafers were cut into 2"×2" squares that were then used for spin-coating. The wafers were washed with high purity water (multiply deionized, electronics grade water was used and is preferred), then acetone, and finally air-dried prior to coating. The wafers were spin-coated with an EC101D Photo Resist Spinner manufactured by Headway Research, Inc. (Garland, Tex., USA).

Example 1

A 1:7 prepolymer was prepared by combining D4Vi (0.5 g, 1.451 mmol), 1,4-BDSB (1.974 g, 10.155 mmol), and 2.6 microliters of platinum catalyst solution (20 ppm Pt). The sample was heated to 120° C. and monitored by infrared spectroscopy. After 2 hr, infrared showed complete loss of the vinyl groups (1600 cm$^{-1}$) and a large amount of Si—H groups (2119 cm$^{-1}$) remaining, indicating that the reaction had reached complete conversion. This composition is indefinitely stable upon storage.

To spin coat a silicon wafer, the composition was diluted with D4Vi (1.250 g, 3.628 mmol) and 1.3 microliters of Pt catalyst solution.

This final prepolymer solution contains the proper stoichiometric amounts of D4Vi and 1,4-BDSB comonomers (2 moles of 1,4-BDSB per 1 mole of D4Vi; 1 Si—H group per 1 Si-vinyl group) but is significantly more viscous than that obtained by simply combining the comonomers in the stoichiometric ratio. This prepolymer mixture was found to be acceptable for spin-coating onto silicon wafers.

A 2" silicon wafer was spin-coated with the prepolymer solution at 2000 rpm for 30 sec. The film was cured for 3 hr at 120° C. to give a smooth, glossy, evenly coated film with 1.35 micron thickness. A second wafer was spin-coated with this composition at 3000 rpm for 30 sec and gave a smooth, evenly coated film with 1.00 micron thickness.

Example 2

A 6:1 prepolymer was prepared by combining D4Vi (1.700 g, 4.932 mmol), D4H (0.198 g, 0.822 mmol), and 1.0 microliter of platinum catalyst solution (10 ppm Pt). The sample was heated to 120° C. for 3 hr to give a viscous liquid. This composition is stable and can be stored indefinitely under normal conditions.

This viscous prepolymer was diluted with D4H (0.989 g, 4.110 mmol) and 2.0 microliters of Pt catalyst solution (20 ppm of Pt in overall composition). This final prepolymer solution contains the proper stoichiometric amounts of D4Vi and D4H comonomers (1 moles of D4H per 1 mole of D4Vi), but is significantly more viscous than that obtained by simply combining the comonomers in the stoichiometric ratio. This composition was found to be acceptable for spin-coating onto silicon wafers.

A 2" silicon wafer was spin-coated with the composition described in this Example at 3000 rpm for 60 sec. The film was cured for 3 hr at 120° C. to give a smooth, glossy, evenly coated film of 650 nm thickness.

Example 3

A 1:5 prepolymer was prepared by combining D4Vi (1.200 g, 3.482 mmol), 1,4-BDSB (3.385 g, 17.408 mmol), and 4.8 microliters of platinum catalyst solution (20 ppm Pt). The sample was heated to 120° C. and monitored by infrared spectroscopy. After 2 hr infrared showed complete loss of the vinyl groups (1600 cm$^{-1}$) and a large amount of Si—H groups (2119 cm$^{-1}$) remaining, indicating the reaction had reached complete conversion. This composition is indefinitely stable upon storage.

This viscous liquid was diluted with D4Vi (1.800 g, 5.223 mmol) and 1.9 microliters of Pt catalyst solution. This final prepolymer solution contains the proper stoichiometric amounts of D4Vi and 1,4-BDSB comonomers (2 moles of 1,4-BDSB per 1 mole of D4Vi) but is significantly more viscous than that obtained by simply combining the comonomers in the stoichiometric ratio. The viscosity of this solution was found to be 294 cps as measured on a Brookfield LVDV-II+Pro Viscometer. This composition was found to be acceptable for spin-coating onto silicon wafers.

A 2" silicon wafer was spin-coated with the composition described in this Example under the conditions shown in Table 1. The film was cured for 1 to 5 hr at 120° C. to give a smooth, glossy, evenly coated film with the indicated thickness.

TABLE 1

Thickness of coating derived from D4Vi and 1,4-BDSB (Initial molar ratio = 1:5)

| Example | Spin rate, rpm | Spin time, sec | Film Thickness, microns |
|---|---|---|---|
| 2 A | 2000 | 60 | 4.07 |
| 2 B | 3000 | 30 | 3.99 |
| 2 C | 3000 | 60 | 2.95 |
| 2 D | 3000 | 90 | 2.52 |
| 2 E | 3000 | 60 | 2.91 |
| 2 F | 4000 | 60 | 2.19 |

Example 4

A 1:6 prepolymer was prepared by combining D4Vi (1.000 g, 2.901 mmol), 1,4-BDSB (3.385 g, 17.408 mmol), and 4.6 microliters of platinum catalyst solution (20 ppm Pt). The sample was heated to 120° C. and monitored by infrared spectroscopy. After 2 hr infrared showed complete loss of the vinyl groups (1600 cm$^{-1}$) and a large amount of Si—H groups (2119 cm$^{-1}$) remaining, indicating the reaction had reached complete conversion. This composition is indefinitely stable upon storage.

This viscous composition was diluted with D4Vi (2.000 g, 5.8033 mmol) and 2.1 microliters of Pt catalyst solution. This final prepolymer solution contains the proper stoichiometric amounts of D4Vi and 1,4-BDSB comonomers (2 moles of 1,4-BDSB per 1 mole of D4Vi) but is significantly more viscous than that obtained by simply combining the comonomers in the stoichiometric ratio. The viscosity of this solution was found to be 71 cps as measured on a Brookfield LVDV-II+Pro Viscometer. This composition was found to be acceptable for spin-coating onto silicon wafers.

A 2" silicon wafer was spin-coated with the composition described in this Example under the conditions shown in Table 2. The film was cured for 1 to 5 hr at 120° C. to give a smooth, glossy, evenly coated film with the indicated thickness.

TABLE 2

Thickness of coating derived from D4Vi and 1,4-BDSB (Initial molar ratio = 1:6)

| Example | Spin rate, rpm | Spin time, sec | Film Thickness, microns |
| --- | --- | --- | --- |
| 3 A | 2000 | 90 | 1.48 |
| 3 B | 2000 | 30 | 2.49 |
| 3 C | 2000 | 60 | 1.81 |
| 3 D | 2000 | 60 | 1.85 |
| 3 E | 3000 | 30 | 1.66 |
| 3 F | 3000 | 90 | 1.05 |
| 3 G | 3000 | 60 | 1.13 |
| 3 H | 3000 | 30 | 1.70 |
| 3 I | 3000 | 60 | 1.27 |
| 3 J | 3000 | 60 | 1.22 |
| 3 K | 3000 | 90 | 1.04 |
| 3 L | 4000 | 60 | 0.89 |
| 3 M | 4000 | 60 | 0.96 |
| 3 N | 4000 | 30 | 1.04 |

Example 5

A 1:7 prepolymer was prepared by combining D4Vi (0.600 g, 1.741 mmol), 1,4-BDSB (2.369 g, 12.186 mmol), and 3.1 microliters of platinum catalyst solution (20 ppm Pt). The sample was heated to 120° C. and monitored by infrared spectroscopy. After 2 hr, infrared showed complete loss of the vinyl groups ($1600 \text{ cm}^{-1}$) and a large amount of Si—H groups ($2119 \text{ cm}^{-1}$) remaining, indicating that the reaction had reached complete conversion. This composition is stable and can be stored indefinitely under normal conditions.

This viscous prepolymer was diluted with D4Vi (1.500 g, 4.353 mmol) and 1.6 microliters of Pt catalyst solution. This final prepolymer solution contains the proper stoichiometric amounts of D4Vi and 1,4-BDSB comonomers (2 moles of 1,4-BDSB per 1 mole of D4Vi) but is significantly more viscous than that obtained by simply combining the comonomers in the stoichiometric ratio. The viscosity of this solution was found to be 37.8 cps as measured on a Brookfield LVDV-II+Pro Viscometer. This composition was found to be acceptable for spin-coating onto silicon wafers.

A 2" silicon wafer was spin-coated with the composition described in this Example under the conditions shown in Table 3. The film was cured for 1 to 5 hr at 120° C. to give a smooth, glossy, evenly coated film with the indicated thickness.

TABLE 3

Thickness of coating derived from D4Vi and 1,4-BDSB (Initial molar ratio = 1:7)

| Example | Spin rate, rpm | Spin time, sec | Film Thickness, microns |
| --- | --- | --- | --- |
| 4 A | 2000 | 60 | 1.07 |
| 4 B | 3000 | 60 | 0.76 |
| 4 C | 3000 | 30 | 1.03 |
| 4 D | 3000 | 60 | 0.77 |
| 4 E | 3000 | 90 | 0.69 |
| 4 F | 4000 | 60 | 0.59 |
| 4 H | 4000 | 90 | 0.56 |
| 4 I | 3500 | 70 | 0.67 |

Example 6

A 1:5.5 prepolymer was prepared in a manner similar to that described in Example 1, using the appropriate amounts of D4Vi and 1,4-BDSB. The sample was diluted with enough D4Vi to bring the mixture to the correct stoichiometry. The resulting solution was found to be useful for the preparation of uniform, glossy thin films by spin-coating as shown by Table 4.

TABLE 4

Thickness of coating derived from D4Vi and 1,4-BDSB (Initial ratio = 1:5.5)

| Example | Spin rate, rpm | Spin time, sec | Film Thickness, microns |
| --- | --- | --- | --- |
| 5 A | 3000 | 60 | 1.73 |
| 5 B | 3500 | 70 | 1.43 |

Example 7

A 1:6.5 prepolymer was prepared in a manner similar to that described in Example 1, using the appropriate amounts of D4Vi and 1,4-BDSB. The sample was diluted with enough D4Vi to bring the mixture to the correct stoichiometry. The resulting solution was found to be useful for the preparation of uniform, glossy thin films by spin-coating as shown by Table 5.

TABLE 5

Thickness of coating derived from D4Vi and 1,4-BDSB (Initial ratio = 1:6.5)

| Example | Spin rate, rpm | Spin time, sec | Film Thickness, microns |
| --- | --- | --- | --- |
| 6 A | 3000 | 60 | 0.88 |
| 6 B | 3500 | 70 | 0.75 |

Comparative Example A

A 1:4.5 prepolymer was prepared by combining D4Vi (0.500 g, 1.451 mmol), 1,4-BDSB (1.269 g, 6.528 mmol), and 1.9 microliters of platinum catalyst solution (20 ppm Pt). The sample was heated to 120° C., whereupon the mixture turned to a gel. D4Vi (0.625 g, 1.814 mmol) was added, but the gel did not dissolve, rendering the composition unsuitable for spin-coating.

Gels unsuitable for spin-coating were also formed with prepolymer compositions ranging from 1:1 to 4:1 D4H:1,4-BDSB ratios.

Comparative Example B

An 1:8 prepolymer was prepared by combining D4Vi (0.500 g, 1.451 mmol), 1,4-BDSB (2.256 g, 11.606 mmol), and 2.9 microliters of platinum catalyst solution (20 ppm Pt). The sample was heated to 120° C. to achieve complete conversion. To the sample was added to 1.500 g of D4Vi (4.353 mmol) to give a stoichiometrically balanced prepolymer solution.

This composition was spin-coated onto a 2" silicon wafer. The liquid coating beaded during coating to give very non-uniform, partial coverage, and thus unacceptable film quality.

Comparative Example C

A 4:1 prepolymer was prepared by combining D4Vi (2.500 g, 7.253 mmol), D4H (0.436 g, 1.813 mmol), and 3.1 microliters of platinum catalyst solution (20 ppm Pt). The sample was heated to 120° C. for 30 min. The solution became viscous upon heating. To this prepolymer solution sample was added D4H (1.308 g, 5.440 mmol) and 1.4 microliters of platinum catalyst solution (20 ppm Pt in overall composition). This provided a viscous solution that was acceptable for spin-coating onto silicon wafers. However, this prepolymer solution is not stable upon storage. Gel was also formed with prolonged heating at 120° C.

Comparative Example D

A 5:1 prepolymer was prepared by combining D4Vi (1.500 g, 4.352 mmol), D4H (0.209 g, 0.870 mmol), and 0.9 microliters of platinum catalyst solution (10 ppm Pt). The sample was heated to 120° C. for 3 hr. The viscosity of this prepolymer solution increased during this heating period. This composition is stable and can be stored indefinitely under normal conditions.

This viscous prepolymer was diluted with 0.837 g of D4H (3.482 mmol) and 1.8 microliters of Pt catalyst solution (20 ppm of Pt in overall composition). This final prepolymer solution contains the proper stoichiometric amounts of D4Vi and D4H comonomers (1 moles of D4H per 1 mole of D4Vi), but is significantly more viscous than that obtained by simply combining the comonomers in the stoichiometric ratio.

This composition was spin-coated onto a 2" silicon wafer at 3000 rpm for 60 sec. After curing, the resulting film had a glossy surface and showed a comet defect pattern due to small amounts of gel present in the solution.

A prepolymer solution prepared similarly, but with a 4.5:1 ratio of D4Vi:D4H showed a similar problem.

Comparative Example E

A 1:4 prepolymer was prepared by combining D4Vi (1.000 g, 2.901 mmol), D4H (2.791 g, 11.606 mmol), and 2.0 microliters of platinum catalyst solution (10 ppm Pt). The sample was heated to 120° C., whereupon the mixture turned to a non-flowing gel. D4Vi (3.000 g, 8.705 mmol) were added, but the gel did not dissolve, rendering the composition unsuitable for spin-coating.

Gels were also formed with prepolymer compositions ranging from 1:4 to 1:16 D4Vi:D4H ratios Comparative Example F A prepolymer composition was prepared using an 8:1 ratio of D4Vi:D4H following the same procedure used in Example 2. The sample was diluted with D4H to give a low viscosity mixture with the desired 1:1 stoichiometric ratio of D4Vi:D4H. This sample was then spin-coated onto a silicon wafer. During the curing reaction the film beaded, resulting in an unusable coating.

What is claimed is:

1. A process comprising:
    a. forming a prepolymer by reacting an unbalanced stoichiometric mixture of a first monomer comprising two or more Si—H groups and a second monomer comprising two or more Si-(alkenyl) groups in the presence of a hydrosilation catalyst; and
    b. combining the prepolymer with additional first monomer or second monomer to form a prepolymer mixture of balanced stoichiometry; and
    c. heating the prepolymer mixture of balanced stoichiometry to form a cured polymer.

2. The process of claim 1, further comprising coating the polymer of balanced stoichiometry onto a substrate prior to forming a cured polymer.

3. The process of claim 1, wherein the hydrosilation catalyst is a Pt hydrosilation catalyst.

4. The process of claim 1, wherein the first monomer is selected from a group consisting of 2,4,6,8-tetramethylcyclotetrasiloxane, 1,1,3,3,5,5-hexamethyltrisiloxane, 1,1,3,3,5,5,7,7-octamethyltetrasiloxane, pentamethylcyclopentasiloxane, trimethylcyclotrisiloxane, tetrakis(dimethylsiloxy)silane, phenyltris(dimethylsiloxy)silane, methyltris(dimethylsiloxy)silane, tetraethylcyclotetrasiloxane, 1,1,3,3-tetramethyldimethylsiloxane, 1,1,3,3-tetraisopropyldisiloxane, 1,4-bis(dimethylsilyl)benzene, 1,1,4,4-tetramethyldisilethylene, 1,3-diphenyl-1,3-dimethyldisiloxane, bis(p-dimethylsilyl)phenyl ether, 4,4'-bis(dimethylsilyl)biphenyl, and 2,6-bis(dimethylsilyl)naphthalene.

5. The process of claim 1, wherein the second monomer is selected from a group consisting of 1,3,5-trivinyl-1,3,5-trimethylcyclotrisiloxane, 2,4,6,8-tetramethyl-2,4,6,8-tetravinylcyclotetrasiloxane, 1,3,5-trivinyl-1,1,3,5,5-pentamethyltrisiloxane, tris(vinyldimethylsiloxy)methylsilane, 1,5-divinylhexamethyltrisiloxane, tris(vinyldimethylsiloxy)phenylsilane, tetrakis(vinyldimethylsiloxy)silane, pentavinylpentamethylcyclopentasiloxane, 1,5-divinyl-3-phenylpentamethyltrisiloxane, 1,4-bis(dimethylvinylsilyl)benzene, 4,4'-bis(dimethylvinylsilyl)biphenyl, tetravinylsilane, 2,6-bis(dimethylvinylsilyl)naphthalene, diallyldimethylsilane, diallyldiphenylsilane, tetraallylsilane, phenyltriallylsilane, 1,5-diallyl-3,3-diphenyl-1,1,5,5-tetramethyltrisiloxane, 1,3-diallyltetrakis(trimethylsiloxy)disiloxane, 1,3-diallyltetramethyldisiloxane, and methyltriallylsilane.

6. An article comprising a cured polymer formed by the process of claim 1.

7. The article of claim 6, wherein the article further comprises a substrate and the cured polymer forms a layer on the substrate.

* * * * *